(12) United States Patent
Riviere et al.

(10) Patent No.: US 10,384,343 B2
(45) Date of Patent: Aug. 20, 2019

(54) MODULAR ROBOTIC FINGER FOR GRASPING AND DEXTEROUS HANDLING

(71) Applicants: CENTRE NATIONAL DE LA RECHERCHE SCIENTIFIQUE (CNRS), Paris (FR); UNIVERSITE DE POITIERS, Poitiers (FR)

(72) Inventors: Thomas Riviere, Poitiers (FR); Marc Arsicault, Montamise (FR); Jean-Pierre Gazeau, Chatellerault (FR); Philippe Vulliez, Lavoux (FR); Said Zeghloul, Terce (FR)

(73) Assignees: CENTRE NATIONAL DE LA RECHERCHE SCIENTIFIQUE (CNRS), Paris (FR); UNIVERSITE DE POITIERS, Poitiers (FR)

( * ) Notice: Subject to any disclaimer, the term of this patent is extended or adjusted under 35 U.S.C. 154(b) by 197 days.

(21) Appl. No.: 15/518,880

(22) PCT Filed: Oct. 14, 2015

(86) PCT No.: PCT/EP2015/073800
§ 371 (c)(1),
(2) Date: Apr. 13, 2017

(87) PCT Pub. No.: WO2016/059121
PCT Pub. Date: Apr. 21, 2016

(65) Prior Publication Data
US 2017/0217014 A1    Aug. 3, 2017

(30) Foreign Application Priority Data
Oct. 16, 2014    (FR) ..................................... 14 59956

(51) Int. Cl.
B25J 17/00    (2006.01)
B25J 17/02    (2006.01)
(Continued)

(52) U.S. Cl.
CPC ........... *B25J 9/104* (2013.01); *B25J 15/0009* (2013.01)

(58) Field of Classification Search
CPC .............................. B25J 9/104; B25J 15/0009
See application file for complete search history.

(56) References Cited

U.S. PATENT DOCUMENTS 4,643,473 A * 2/1987 Douglas ............... B25J 15/0009
                                                    294/111
4,834,761 A * 5/1989 Walters .................... B25J 9/104
                                                    254/228

(Continued)

FOREIGN PATENT DOCUMENTS

CN    101 045 300 A    10/2007
JP    S62 228391 A    10/1987

OTHER PUBLICATIONS

Search Report in French Application No. 1459956 dated Jul. 8, 2015, with English translation coversheet. 4 pages.
(Continued)

*Primary Examiner* — Jake Cook
(74) *Attorney, Agent, or Firm* — Womble Bond Dickinson (US) LLP

(57) ABSTRACT

The invention concerns a device forming a robotic finger comprising a base (100) forming a palm, at least one knuckle (500, 700, 900) articulated on the base (100) about two separate joints (200, 400) non-parallel to each other, at least two actuators (110, 120, 130, 140) and cable-linking means (112, 122) respectively linking the two actuators (110, 120) to drive elements of said two joints (200, 400), characterized in that the device comprises guide means (150, 151, 152) designed to guide the cables involved in the control of each joint (400, 600, 800) located after the first joint (200) on the (Continued)

base (100), in a common plane passing through the axis (202) of said first joint (200).

13 Claims, 16 Drawing Sheets

(51) Int. Cl.
*B25J 18/00* (2006.01)
*B25J 9/10* (2006.01)
*B25J 15/00* (2006.01)

(56) References Cited

U.S. PATENT DOCUMENTS

| | | | |
|---|---|---|---|
| 5,062,673 A | 11/1991 | Mimura | |
| 5,092,646 A * | 3/1992 | Smallridge | B25J 9/104 254/278 |
| 6,668,678 B1 * | 12/2003 | Baba | B25J 9/104 414/680 |
| 6,817,641 B1 * | 11/2004 | Singleton, Jr. | B25J 9/102 294/106 |
| 9,566,173 B2 * | 2/2017 | Ryu | G06F 3/011 |
| 2001/0018591 A1 | 8/2001 | Brock et al. | |
| 2004/0054424 A1 * | 3/2004 | Matsuda | B25J 9/104 623/64 |
| 2005/0006915 A1 * | 1/2005 | Matsuda | B25J 9/104 294/99.1 |
| 2007/0035143 A1 * | 2/2007 | Blackwell | B25J 9/104 294/111 |
| 2010/0147098 A1 * | 6/2010 | Park | B25J 9/104 74/490.06 |
| 2011/0067520 A1 * | 3/2011 | Ihrke | B25J 9/104 74/490.05 |
| 2011/0071678 A1 * | 3/2011 | Ihrke | B25J 9/104 700/258 |
| 2011/0163561 A1 * | 7/2011 | Kim | B25J 9/104 294/111 |

OTHER PUBLICATIONS

International Search Report in PCT/EP2015/073800 dated Jan. 18, 2016, with English translation. 6 pages.
Hashimoto et al. "An Unilateral Master-Slave Hand System with a Force-Controlled Slave Hand." Proceedings of the Int. Conference on Robotics and Automation. IEEE (May 21, 1995). pp. 956-961.

* cited by examiner

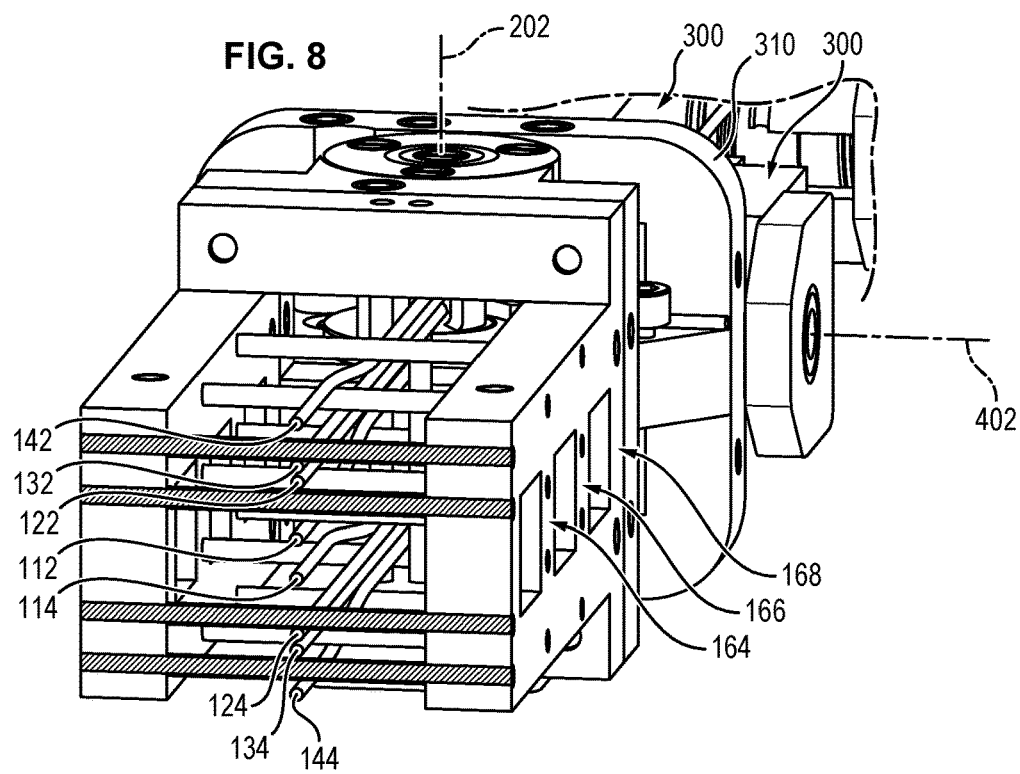

FIG. 16bis
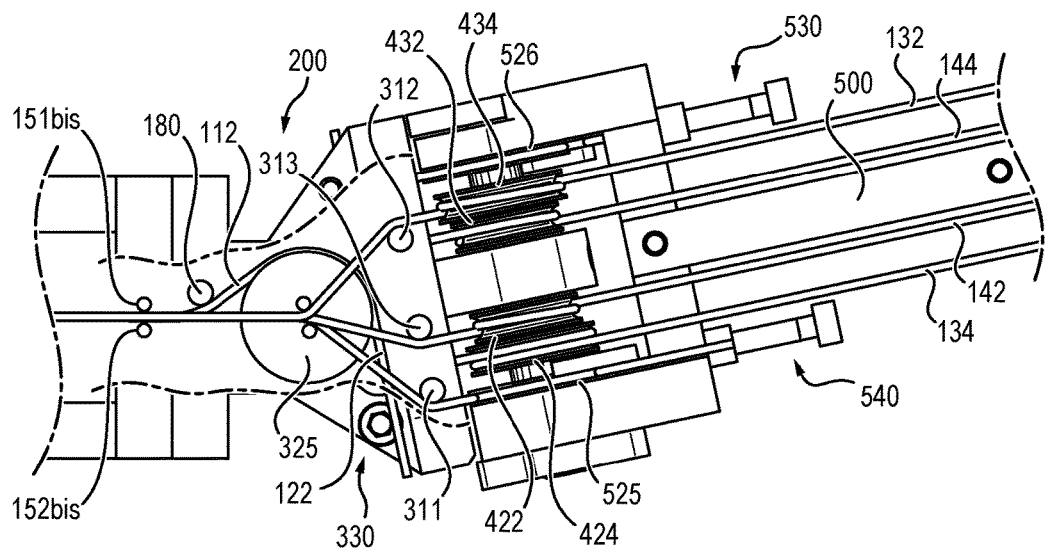
FIG. 16ter
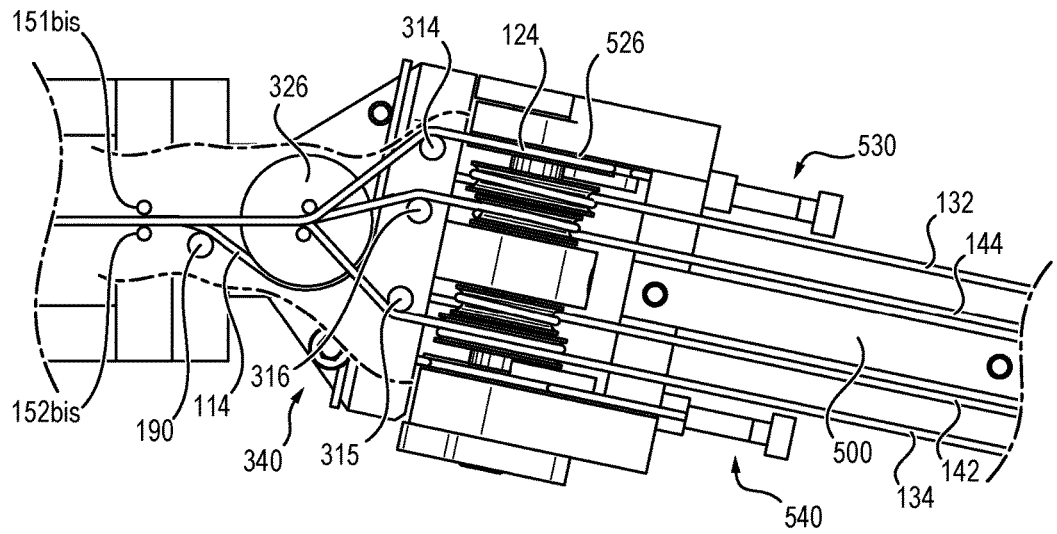

MODULAR ROBOTIC FINGER FOR GRASPING AND DEXTEROUS HANDLING

TECHNICAL FIELD

The present invention relates to the field of robotic fingers.

What is meant by "robotic finger" is an assembly of mechanical means, mutually hinged like the phalanges of a finger of a hand and controlled in displacement by actuators controlled by external means, such as automatic systems or processors.

As will be seen below, within the scope of the present invention, different fingers can be combined to form a gripper or a robotic hand.

GOAL OF THE INVENTION

The goal of the present invention is to improve the performance of known robotic hand devices, particularly with regard to grasping objects on the one hand, and the fine handling of objects at the fingertip on the other hand.

One goal of the invention is in particular to propose means allowing identical kinematics to those of a human finger to be achieved.

PRIOR ART

The creation of robotic fingers or hands has already led to a proliferation of literature on the subject.

Examples will be found in the following documents:

Grebenstein M., "Approaching human performance: the functionality driven Awiwi Robot Hand," Diss. ETH No 20471, 2012.

Iversen E. K., Khutti D. F., Johnson R. T., Biggers K. B., Jacobsen S. C., "Design of the UTAH/MIT dexterous hand," in International Conference on Robotics and Automation, 1986, pp. 1520-1532.

Liu et Al., "Multisensory Five-Finger Dexterous Hand: The DLR/HIT Hand II," IEEE/RSJ International Conference on Intelligent Robots and Systems, 2008.

S. Ueki, H. Kawasaki, T. Mouri, "Adaptive Coordinated Control of Multi-Fingered Robot Hand," Journal of Robotics and Mechatronics, Vol. 21 No. 1, 2009.

Jun Ueda, Yutaka Ishida, Masahiro Kondo, Tsukasa Ogasawara, "Development of the NAIST-Hand with Vision-based Tactile Fingertip Sensor," Proceedings of the 2005 IEEE International Conference on Robotics and Automation (ICRA 2005), pp. 2343-2348, 2005.

N. Daoud, J. P. Gazeau, S. Zeghloul, M. Arsicault, "A real-time strategy for dexterous manipulation: Fingertips motion planning, force sensing and grasp stability," Journal of Robotics and Autonomous Systems, Vol. 60, March 2012, pp. 377-386.

J. P. Gazeau, S. Zeghloul, G. Ramirez, "Manipulation with a polyarticulated mechanical hand: a new efficient real-time method for computing fingertip forces for a global manipulation strategy," Robotica, vol. 23, 2005, pp. 479-490.

D. Chaigneau, M. Arsicault, J. P. Gazeau, S. Zeghloul, "LMS robotic hand grasp and manipulation planning (an isomorphic skeleton approach)" Robotica (2008), vol. 26, 2008, pp. 177-188.

N. Daoud, J. P. Gazeau, S. Zeghloul, M. Arsicault, "A fast grasp synthesis method for online manipulation," Journal of Robotics and Autonomous Systems, vol. 59, 2011, pp. 421-427.

F. Touvet, N. Daoud, J. P. Gazeau, S. Zeghloul, M. A. Maier, S. Eskiizmirliler, "A biomimetic reach and grasp approach for mechanical hand", Journal of Robotics and Autonomous Systems, vol. 60, 2012, pp. 473-486.

Without commenting in detail about all the solutions already proposed, two types of robotic hands frequently cited in the literature and generally designated "Shadow hand" and "AWIWI hand" will be mentioned below.

Shadow Hand

The SHADOW hand is a robotic hand with an anthropomorphic design, the dimensions whereof are comparable to a human hand. It comprises actuators which can be pneumatic rams or electric motors depending on the embodiment. The hinges are actuated by cable transmission. The hand with its 5 fingers has 20 actuated degrees of freedom and 4 coupled degrees of freedom for a total of 24 hinges. The movement amplitudes are very close to the amplitudes of the human hand.

Though having genuine advantages, the so-called Shadow hand has certain limitations. The mechanics of the hand do not allow fine control of the ends of the fingers in space. In fact the abduction-adduction movement is subject to non-linearities (mechanical clearances, friction), which prevent producing precise movements of the fingers for handling objects on the ends of the fingers by using this movement (screwing in light bulbs for example).

AWIWI Hand or Hyper-Robust Hand

The Robotics and Mechatronics Institute of the German Aerospace Center (DLR) has developed a hand capable of resisting collisions with rigid objects as well as hammer-blows without suffering any alteration of the mechanics of the hand. The robustness of the hand has been set as the core of the invention. The developed hand has anthropomorphic dimensions equipped with its 5 fingers. The latter include a total of 19 hinges with are actuated through 38 tendons each connected to an actuator. The control of the 38 actuators thus allows for constant control of the stiffness of the tendons and for absorbing considerable shocks.

The essential drawback of this hand is the high degree of actuation, in that the design requires two actuators per hinge so as to control the stiffness of the finger. This makes it sizeable and heavy, with a bulky forearm. The considerable friction also impacts the capacity of the hand to produce fine movements at the fingertips. Thus, to date, it has been impossible to demonstrate the fine handling of objects with the fingertips of this hand. The proposed demonstrations demonstrate adaptive grasping capabilities and capabilities for numerous interactions in view of the hand's shock absorbent qualities.

DESCRIPTION OF THE INVENTION

The invention relates to a device forming a robotic finger including a base forming a palm, at least one phalange hinged to the base around two independent hinges not parallel with one another, at least two actuators, cable-linking means connecting respectively the two actuators to driving elements of said two hinges, and guide means adapted for guiding the cables involved in the control of each hinge located after the first hinge on the base, in a common plane passing through the axis of this first hinge, characterized in that the guide means are formed from cylindrical needles extending along axes parallel to the first hinge axis, carried by the base, that the device comprises at least two needles at the output of a guide stage the separation whereof corresponds substantially, to the prerequisite operational clearance for ensuring free translation of the cables, to the diameter thereof, the two needles being positioned symmetrically on either side of a plane of symmetry passing through the first hinge axis and guiding the cables at the input of the first hinge, and that the device further comprises a frame which carries two series of diabolo-shaped parts symmetric with respect to the axis of the first hinge and intended to guide the cables coming from the guide stage formed by said needles, toward the downstream hinges.

Preferably the first hinge axis on the base constitutes an abduction-adduction axis, while the second hinge axis constitutes a flexure-extension axis.

The feature mentioned above, according to which the cables involved in the control of each hinge located after the first hinge on the base, are guided in a common plane passing through the first hinge axis, makes it possible to not modify the extension of these cables between the actuator and the corresponding hinge regardless of the position of the first hinge, and also allows friction to be minimized. This makes it possible to maximize the mechanical efficiency and to guarantee the ability to control the finger in force and in position. Moreover, the combination of this guiding of cables within a common plane at the input of the first hinge with the diabolo-shaped parts carried by the cable makes it possible to minimize the friction of the cables involved in the control of each hinge located after the first hinge, regardless of the pivoting amplitude of the first hinge.

According to another advantageous feature of the present invention, the device comprises several phalanges, hinged to one another two by two around a single-axis hinge associated with a respective actuator.

According to a particular embodiment, the device includes four hinges and three phalanges. The movements then proposed are three flexure-extension movements and one abduction-adduction movement.

The transmission of movement between each hinge and the associated actuator is ensured by two transmission cables, which make it possible to ensure respectively a flexure or abduction movement and an extension or adduction movement.

The dimensions of the finger can be adjusted depending on the target application. These dimensions can, as a minimum, correspond to the average dimensions of a human finger.

The structure of the finger conforming to the invention makes it possible to install complete instrumentation for measuring force and position.

Each hinge can integrate hinge measurement.

The fingertip and the phalanges can accommodate force measurement.

Personalized covering of the structure of the finger, for example in the shape of a shell and of a coating connected to the application, can be carried out using attachment elements.

The modularity of each finger makes it possible to assemble several fingers to build a robotic hand with several fingers. The kinematics of the hand (placement of the fingers, number of fingers, dimensions of the fingers, particularly the length of the phalanges) can be adjusted depending on the target application. One can thus make the most complex robotic hand: an anthropomorphic hand in terms of kinematics and dimensions.

Advantages of the Invention

The advantages of the device conforming to the invention comprising a transmission by cables are the following in particular:

the actuators or motors can be deported outside the device, for example outside the hand, hence the possibility of reducing the size of the device and of the hand and their weight for on-board use;

the actuators or motors can easily be dimensioned depending on the application. Dimensional constraints connected to the motors are nonexistent. If high torques are necessary, voluminous motors can be selected. They can for example be positioned at the shoulder of a manipulator arm, the useful lead whereof is naturally greater than for the end of an arm, via judicious routing of the transmission cables;

the natural compliance induced by each cable at a finger offers reliable interaction with the environment by absorbing a portion of the energy connected with the impact;

the elongation forces of a transmission cable can be used so as to evaluate the interaction between the finger and the environment.

DESCRIPTION OF THE FIGURES

Other features, goals and advantages of the present invention will appear upon reading the detailed description which follows, and with reference to the appended drawings, given by way of non-limiting examples and wherein:

FIG. 9 shows an end view in a frontal section plane, of the same needles, FIGS. 16*bis* and 16*ter* show two schematic section view of the first two hinges in two superimposed section planes, mutually parallel and orthogonal to the first hinge axis.

DETAILED DESCRIPTION OF THE INVENTION

The description which follows will be made with reference to an arbitrary coordinate system x y z wherein the plane x z corresponds to a vertical sagittal plane, the plane x y corresponds to a horizontal transverse plane and the plane y z corresponds to a vertical frontal plane.

Figure 1:
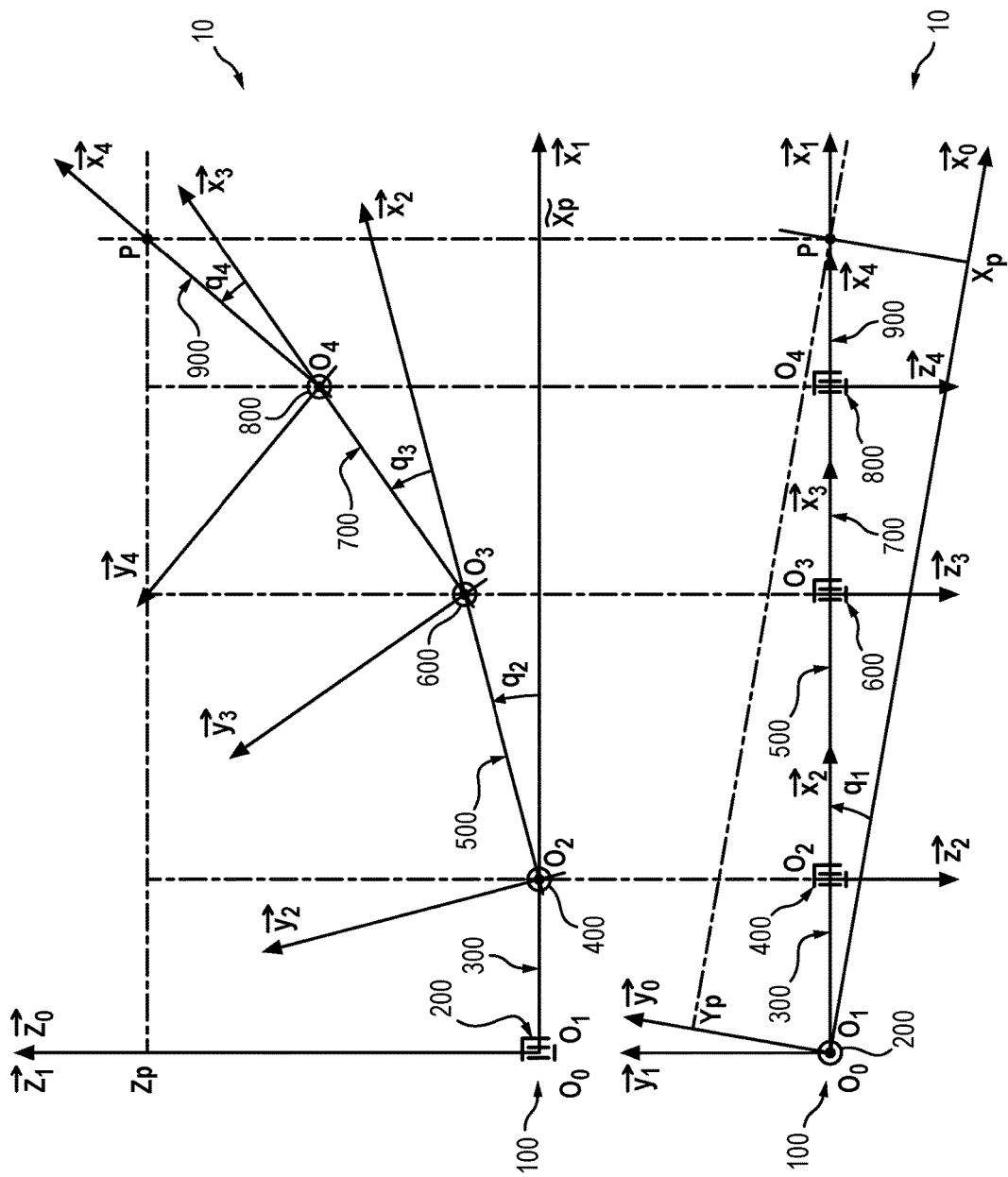
FIG. 1 shows in its FIGS. 1a and 1b which correspond arbitrarily to a sagittal section plane and a cross section plane, different movement axes achievable by the finger conforming to the invention and an orthonormal coordinate system which will be referred to in the description hereafter.
Figure 2:
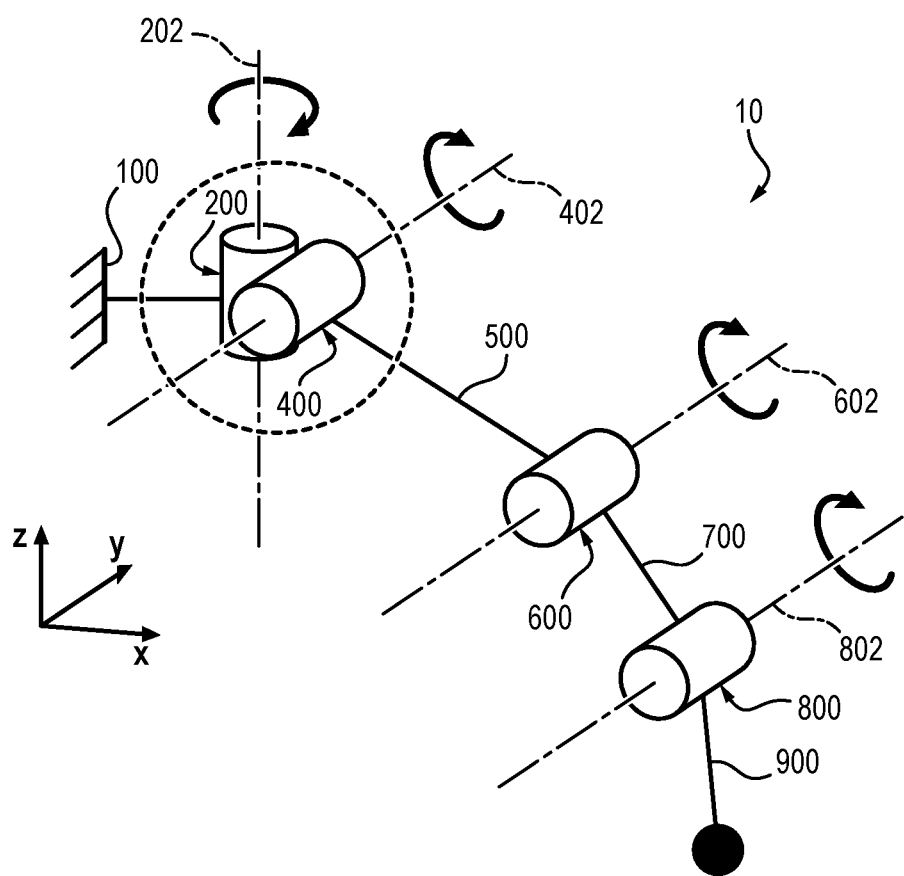
FIG. 2 shows a schematic of the hinged connections contained in a finger conforming to the invention.
Figure 3:
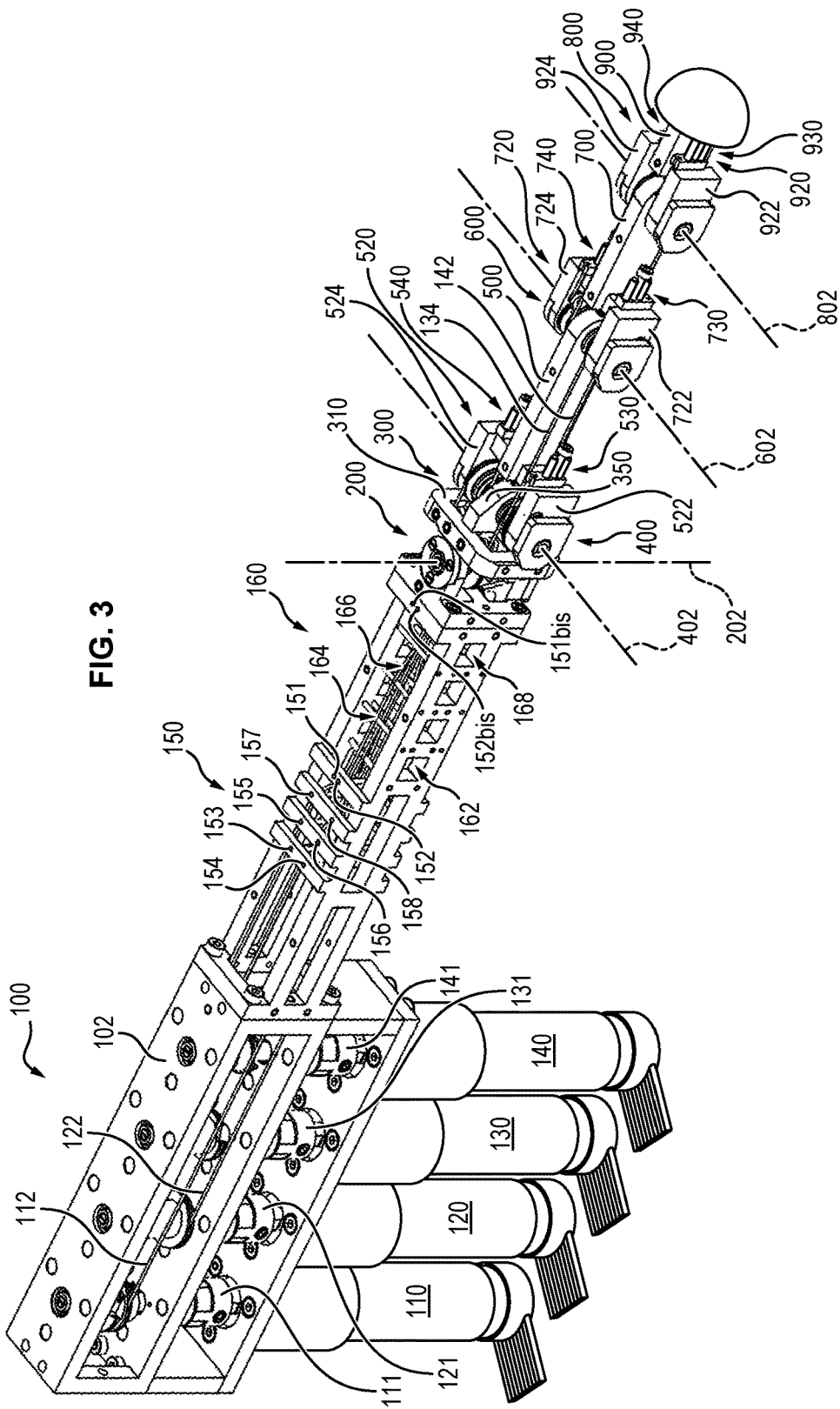
FIG. 3 illustrates a perspective view of an embodiment of a finger conforming to the invention, comprising 3 phalanges.
Figure 4:
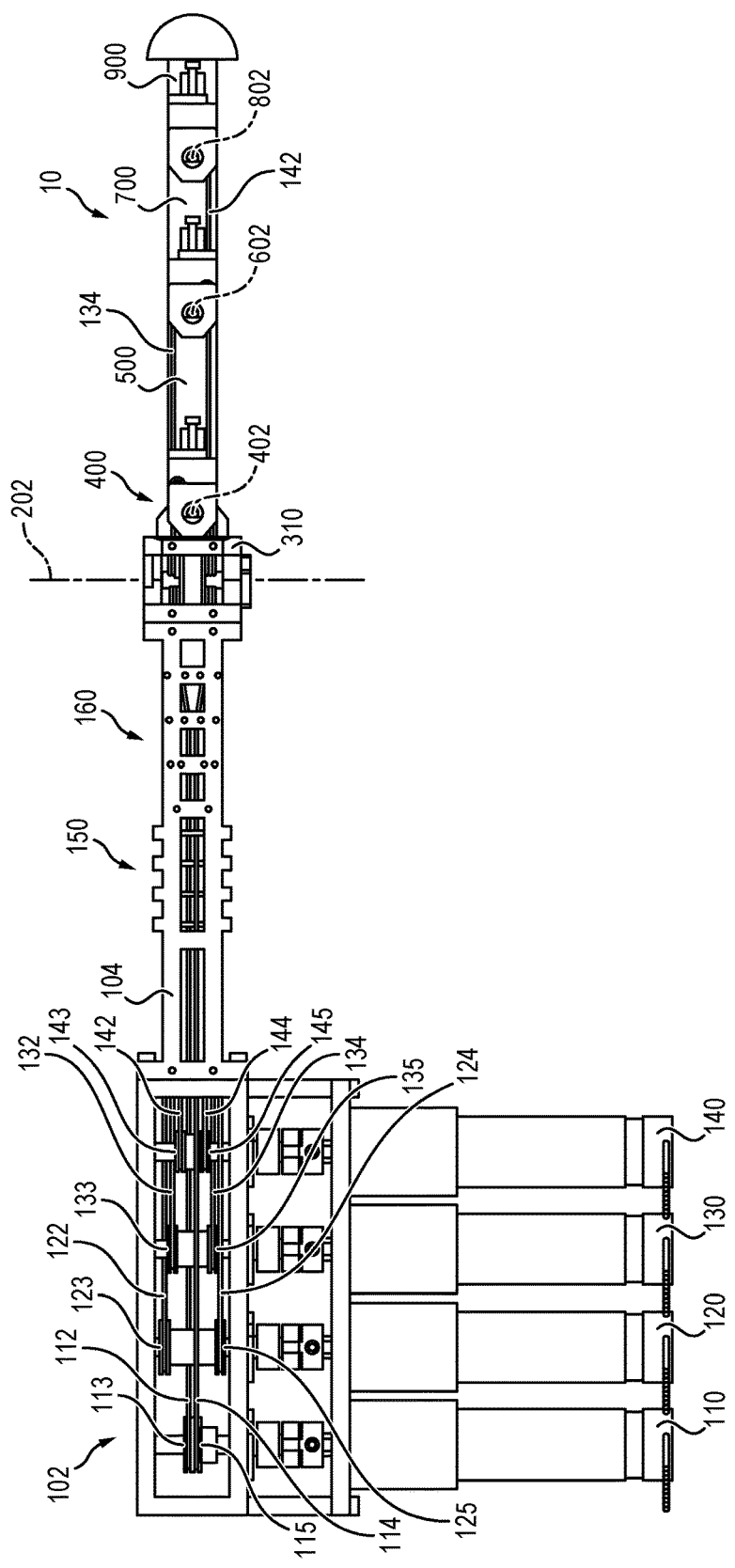
FIG. 4 shows a view of the same finger according to a lateral view corresponding to a plane parallel to a sagittal plane.
Figure 5:
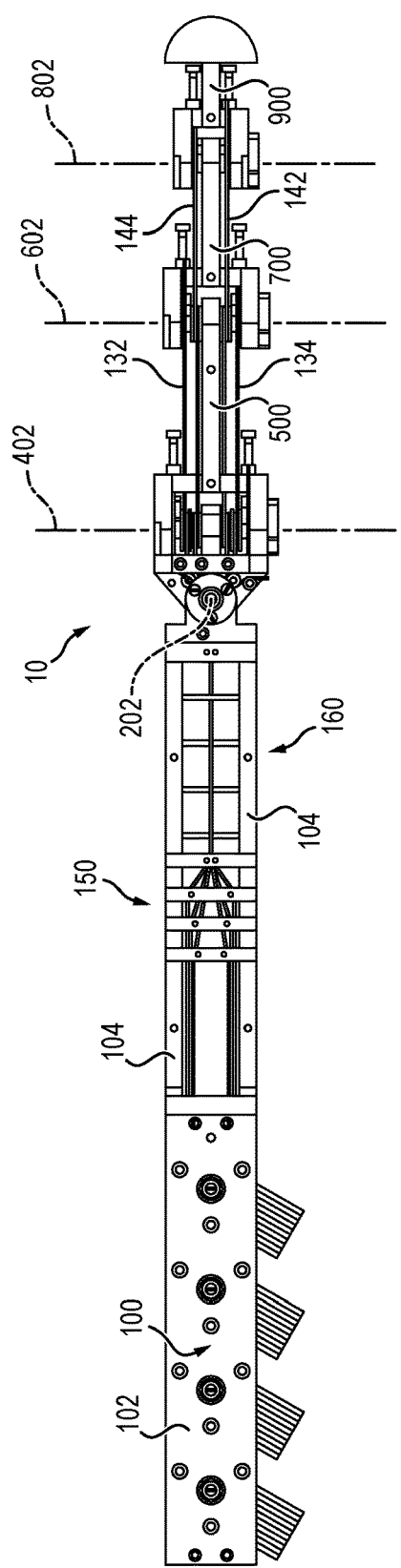
FIG. 5 shows a view of the same finger in a top view corresponding to a plane parallel to a transverse plane.

Shown schematically in FIGS. 1*a*, 1*b* and 2, is a finger 10 comprising three phalanges 500, 700 and 900: a first phalange 500 hinged to a base which will be designated 100 hereafter around a first hinge 200 defining a first abduction-adduction axis 202 and a second hinge 400 defining a second flexure-extension axis 402, connected to the hinge 200 via an intermediate assembly 300, the second, intermediate phalange 700 being hinged to the first phalange 500 by a hinge 600 defining a third flexure-extension axis 602 and the third, distal phalange 900 being hinged to the second phalange 700 by a hinge 800 defining a fourth flexure-extension axis 802.

The abduction-adduction axis 202 extends along a vertical axis z.

The flexure-extension axes 402, 602 and 802 extend along mutually parallel horizontal axes y.

At rest, in a generally aligned position, the 3 phalanges 500, 700 and 900 extend in an extension direction along x.

The amplitude of the abduction or adduction displacement around the axis 202 is designated q1 in FIG. 1*b* with respect to an arbitrary median reference axis x.

The respective amplitudes of flexure displacement around the respective axes 402, 602 and 802 of the three phalanges 500, 700 and 900 with respect to a rest position with rectilinear extension are designated q2, q3 and q4.

As previously indicated, an elementary robotic finger 10 conforming to the present invention comprises a base 100 forming a palm and at least one phalange 500 hinged to the base 100 around two independent, not mutually parallel hinge axes 202 and 402. Preferably, the two axes 202 and 402 are mutually orthogonal.

The finger 10 further comprises at least two actuators 110 and 120 and cable-linking means 112, 114 and 122, 124 respectively connecting the output of the actuator 110 to receiving drive pulleys 325, 326 provided in the assembly 300 for controlling the first hinge 200 and the output of the actuator 120 at the first phalange 500 for controlling the second hinge 400.

In the embodiment comprising 3 phalanges 500, 700 and 900, the finger comprises 4 actuators 110, 120, 130 and 140, each associated with two cables 112, 114; 122, 124; 132, 134 and 142, 144. Each of the cables 112, 114; 122, 124; 132, 134 and 142, 144 is connected respectively to a receiving drive pulley 325, 326 or an element, in this particular case pulleys 525, 526, 725, 726 and 925, 926, phalanges 500, 700 and 900 for controlling a hinge axis 202, 402, 602 and 802.

Still more precisely according to the invention, the finger comprises guide means 150, 160 adapted for guiding the cables 122, 124; 132, 134 and 142, 144 involved in the control of each hinge 400, 600 and 800 located after the first hinge axis 202 on the base, in a common sagittal plane passing through this first hinge axis 202.

The base 100 can be subject to many embodiments. According to the embodiment shown in the appended figures, the base 100 comprises a housing 102 which carries the actuators 110, 120, 130 and 140 so that they have their respective output axis 111, 121, 131 and 141 rotatably mounted in the housing 102, along an axis parallel to the axis z.

The actuators 110, 120, 130 and 140 are preferably formed from gear motors.

Each output axis 111, 121, 131 and 141 carries two axially stepped drive pulleys 113, 115, 123, 125, 133, 135, 143 and 145 on their respective axes.

The housing 102 is extended on one side by a beam 104 which extends in a longitudinal direction centered on an extension axis along x. This extension axis of the beam 104 corresponds to a median symmetry plane of the beam which passes through all the rotation axes of the four actuators 110, 120, 130 and 140.

A first end of each cable 112, 114; 122, 124; 132, 134 and 142, 144 is attached to a respective pulley 113, 115, 123, 125, 133, 135, 143 and 145.

The pulleys 113, 115, 123, 125, 133, 135, 143 and 145 are located facing the beam 104.

The cables 112, 114; 122, 124; 132, 134 and 142, 144 run in the beam 104 from their respective pulley 113, 115, 123, 125, 133, 135, 143 and 145 in the direction of the first hinge 200.

As indicated previously, the beam 104 comprises two stages 150, 160 of guide means adapted for guiding the cables 112, 114; 122, 124; 132, 134 and 142, 144.

The first stage 150 of guide means has the function of guiding at least the cables 122, 124; 132, 134 and 142, 144 involved in the control of each hinge 400, 600 and 800 located after the first hinge axis 202 on the base, in a common sagittal plane passing through the first hinge axis 202. According to the embodiment shown in the figures, the guide means 150 are formed from cylindrical needles extending along axes parallel to the axis z carried by the beam 104.

Thus there is provided at least two main needles 151, 152 at the output of the first stage 150, the separation whereof corresponds substantially to the prerequisite operational clearance for ensuring free translation of the cables 112, 114; 122, 124; 132, 134 and 142, 144, to the diameter thereof. The two main needles 151, 152 are positioned symmetrically on either side of the symmetry plane in xz of the beam 104 passing through the first hinge axis 202.

Figure 6:
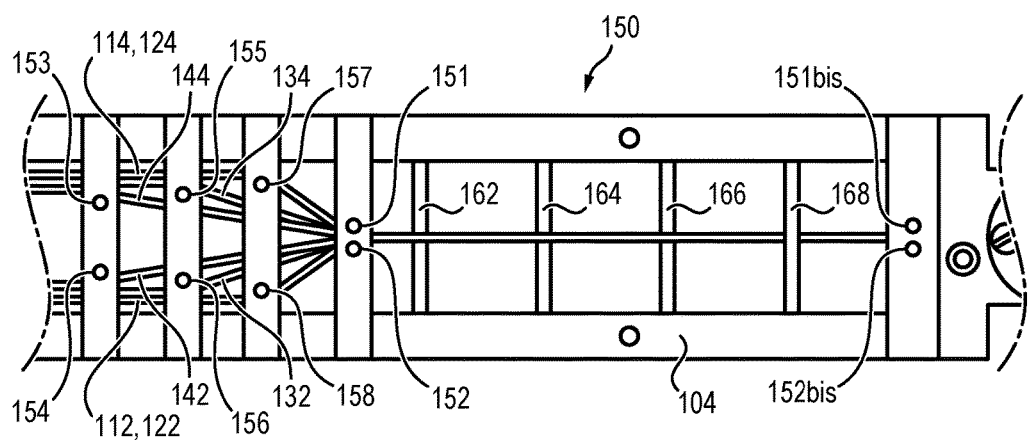
FIG. 6 shows an enlarged partial view of FIG. 5 and illustrates a first stage in cable guide means located in the base forming a palm, upstream of the first hinge.

At the input to the stage 150, the cables 112, 114; 122, 124; 132, 134 and 142, 144, are separated two by two by a distance corresponding to the summation of the respective radii of their respective pulley 113, 115, 123, 125, 133, 135, 143 and 145. As can be seen in FIG. 6, the main needles 151, 152 make it possible to place all the cables 112, 114; 122, 124; 132, 134 and 142, 144, in the common plane passing through the axis 202, at the output of the guide stage 150.

As can also be seen in FIG. 6, the device preferably further comprises three stages of auxiliary needles 153, 154; 155, 156 and 157, 158, upstream of the main needles 151 and 152, which respectively hold certain cables 112, 114; 122, 124; 132, 134 and 142, 144, so as to ensure progressive convergence of pairs of cables between the main needles 151, 152.

The second stage 160 of guide means is placed between the first guide stage 150 and the first hinge 200. It has the function of guiding and staging along the axis z the cables 112, 114; 122, 124; 132, 134 and 142, 144 at the input of the hinge 200 so as to avoid any contact between these cables. More precisely, the guide means 160 also have the function of distributing the cables 112, 114; 122, 124; 132, 134 and 142, 144 into two groups of 4, respectively upper and lower with reference to the axis z, as can be seen in FIG. 7.

Figure 16:
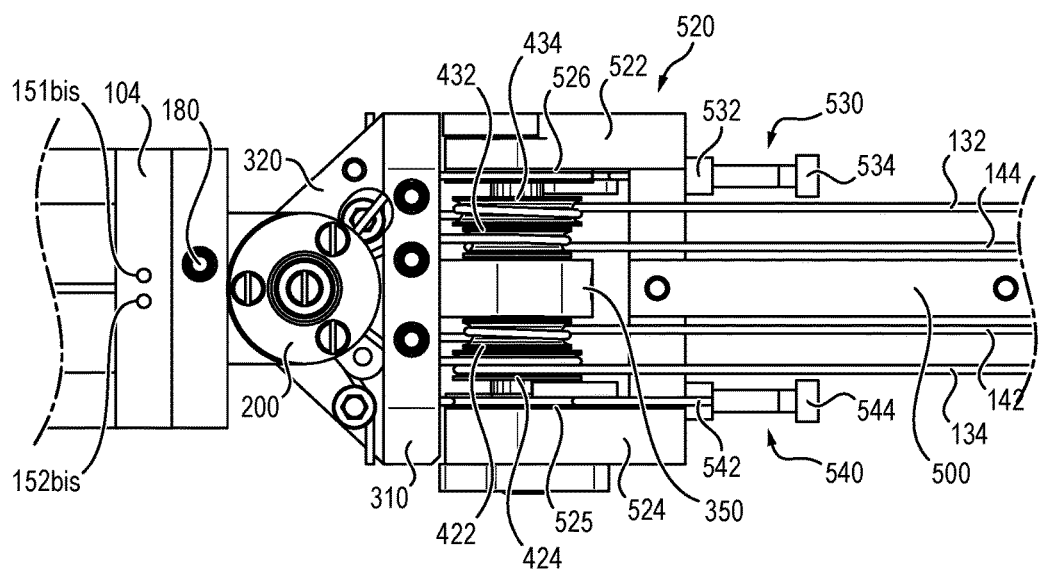
FIG. 16 shows a top view of the complete hinge assembly of the first phalange on the base, around two non-parallel axes.

The upper group of 4 cables 112, 122, 132 and 142 is found in FIG. 16*bis* and the lower group of 4 cables 114, 124, 134 and 144 in FIG. 16*ter*.

According to the embodiment shown in the figures, the guide means 160 are formed from cylindrical needles extending along axes parallel to the axis y carried by the beam 104.

Figure 7:
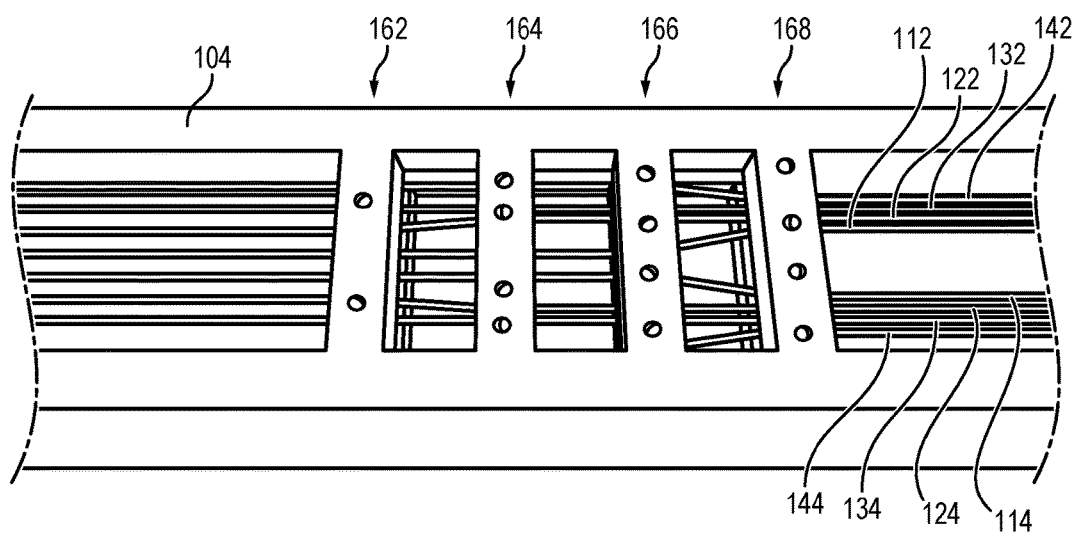
FIG. 7 shows an enlarged partial view of FIG. 4 and illustrates a second stage of cable guide means located in the base forming a palm, between the first stage illustrated in FIG. 6 and the first hinge, FIG. 8 details in a perspective view the position of cylindrical needles serving for guiding transmission cables to the input of the first hinge.

According to the preferred but non-limiting embodiment shown in FIG. 7, the device thus comprises 4 stages of auxiliary needles 162, 164, 166 and 168 which guide the cables 112, 114; 122, 124; 132, 134 and 142, 144, so as to ensure the expected positioning at the input of the hinge 200. The multiplicity of stages 162, 164, 166 and 168 is intended to ensure progressive grouping of the cables into the two aforementioned groups without risk of contact between two cables.

The precise configuration and the number of needles forming the guide stages 162, 164, 166 and 168 can be subject to numerous embodiments and will not be described in more detail hereafter. It will be noted, however, that in combination the 4 guide stages 162, 164, 166 and 168 have needles which serve as spacers between each pair of two adjoining cables at the output of the guide means 160 and needles which serve as a labyrinth for certain cables by successively providing an external support, then an internal support with reference to the z-height of the beam 104, to certain cables.

Preferably provided, moreover, at the output of the guide stage 160, upstream of the hinge 200, are two secondary needles 151*bis*, 152*bis*, parallel to the aforementioned needles 151 and 152, the separation whereof also corresponds substantially to the prerequisite operational clearance for ensuring free translation of the cables 112, 114; 122, 124; 132, 134 and 142, 144, to the diameter thereof, so as to guarantee good positioning of the cables 112, 114; 122, 124; 132, 134 and 142, 144 at the input to the hinge 200. The two secondary needles 151*bis*, 152*bis* are also positioned symmetrically on either side of the symmetry plane in xz of the beam 104 passing through the first hinge axis 202.

The structure of the two first hinges 200 and 400 will now be described, particularly with reference to FIGS. 10 to 16.

As previously indicated, the first hinge 200 preferably corresponds to an abduction-adduction hinge around a z-axis 202, while the second hinge 400 corresponds to a flexure-extension hinge around an y-axis 402, i.e. not parallel to the axis 202 and preferably orthogonal to this axis 202. The two hinges 200 and 400 are separated and carried by an intermediate assembly 300.

If need be, as a variant, the first hinge 200 could correspond to a flexure-extension hinge around an y-axis 202, while the second hinge 400 could correspond to an abduction-adduction hinge around a z-axis 402.

According to the embodiment shown in the appended figures, the intermediate assembly 300 comprises a support frame 310 the median plane whereof extends, at rest, i.e in the centered position with respect to the extreme abduction and adduction positions, in a plane yz. The frame 310 carries respectively on its two opposite faces on either side of the median plane in yz, the abduction-adduction hinge 200 in z and the flexure-extension hinge 400 in y.

More precisely, on a first face the frame 310 carries a small bridge 320 in the shape of a dihedral the median plane in thickness whereof extends in a xy-plane and which supports in rotation two coaxial abduction-adduction half-shafts or pins in z 220, 230 centered on the axis 202. The pins 220, 230 are hinged to the base 100, more precisely to the end of the beam 104, by any appropriate means.

The two half-shafts or pins 220, 230 are located respectively on either side of the small bridge 320. One of the pins 220 carries a pulley 325 receiving the second end of the adduction cable 112. The pulley 325 is connected in rotation with the small bridge 320 and the element 300 and is therefore free in rotation with respect to the pin 220. The other half-pin 230 carries a pulley 326 receiving the second end of the abduction cable 114. The pulley 326 is also connected in rotation with the small bridge 320 and the element 300 and is therefore free in rotation with respect to the pin 230.

The anchoring points of the cables 112 and 114 on their respective pulley 325, 326 are diametrically opposed with respect to the axis 202.

As a variant, the cables 112 and 114 can be wrapped at least partially around the pulleys 325, 326 as shown schematically in FIGS. 16*bis* and 16*ter*, or make a complete revolution around these pulleys, in respectively opposite directions, and their second ends are attached to the small bridge 320 by any appropriate means as illustrated at 330 and 340 in FIGS. 16*bis* and 16*ter*. In this case the pulleys 325 and 326 can be free in rotation with respect to the small bridge 320, on the pins 220, 230. Preferably, the attachment means 330, 340 are provided with tension adjustment means as will be described afterward for cables 122, 124, 132, 134, 142 and 144.

The ends of the pins 220 and 230 carry means 226, 236, such as ball bearings, forming rotation guide bearings for the adjoining end of the beam 104.

Between the pulleys 325, 326 and the bearings 226, 236, each pin 220, 230 carries a cage 222, 232 each defining a window for passage and guidance of cables 122, 124; 132, 134 and 142, 144, directed toward the downstream hinges 400, 600 and 800.

More precisely, each cage 222, 232 has two series of respectively coaxial rotating parts, in the shape of diabolos 223, 224 and 233, 234. Each series of parts in the shape of diabolos 223, 224 and 233, 234 is centered on a respective z axis. The diabolo-shaped parts 223, 224 provided in the cage 222 are symmetrical with respect to the axis 202. Likewise, the diabolo-shaped parts 233, 234 provided in the cage 232 are symmetrical with respect to the axis 202.

Furthermore, each series of diabolo-shaped parts 223, 224 and 233, 234 includes a number of diabolo-shaped parts equal in number to the cables to be guided, respectively 122, 132, 142 and 124, 134, 144.

Figure 10:
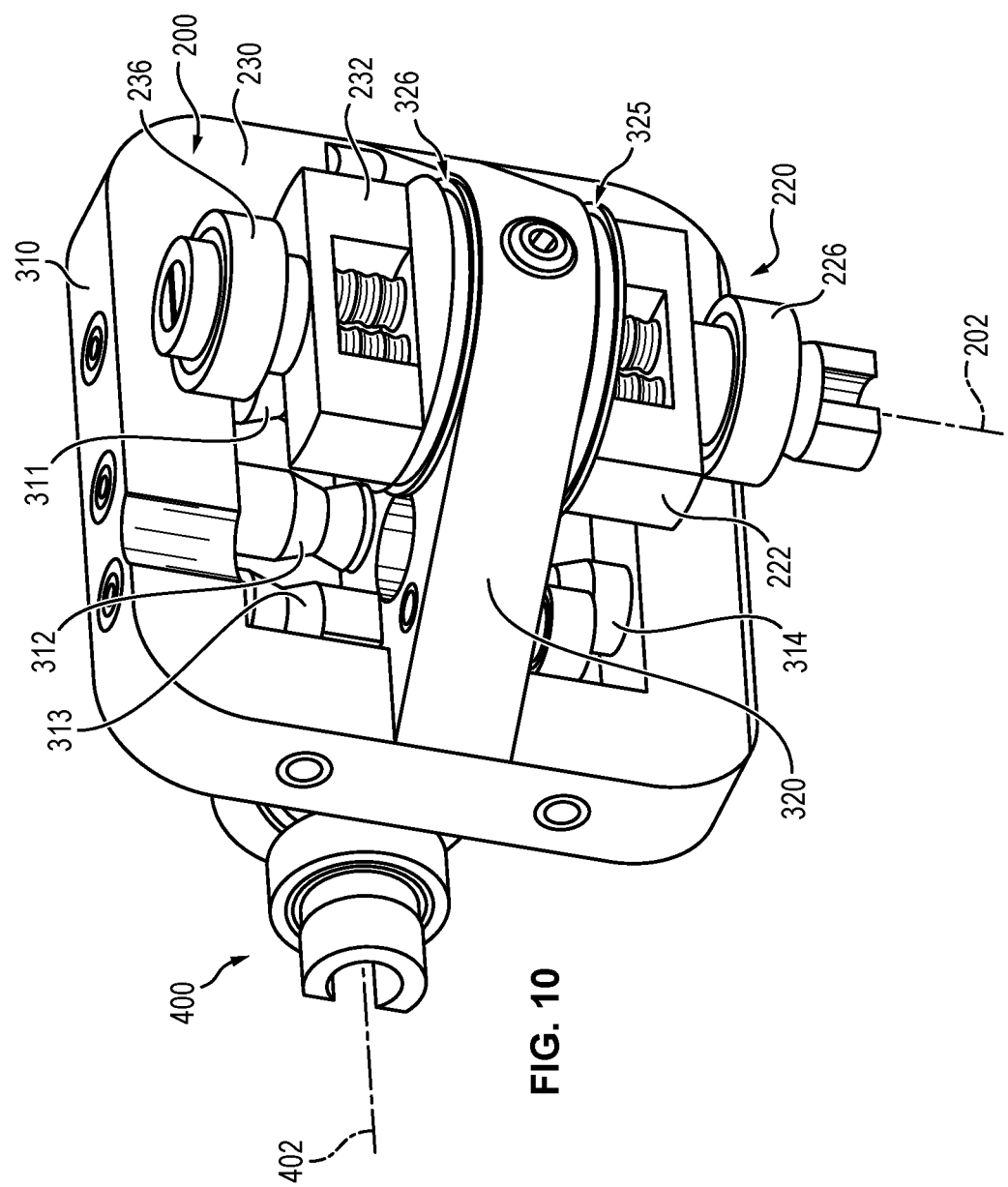
FIG. 10 shows a partial perspective view of the hinge assembly of the first phalange to the base, around two mutually non-parallel axes, corresponding to abduction-adduction and flexure-extension axes.
Figure 13:
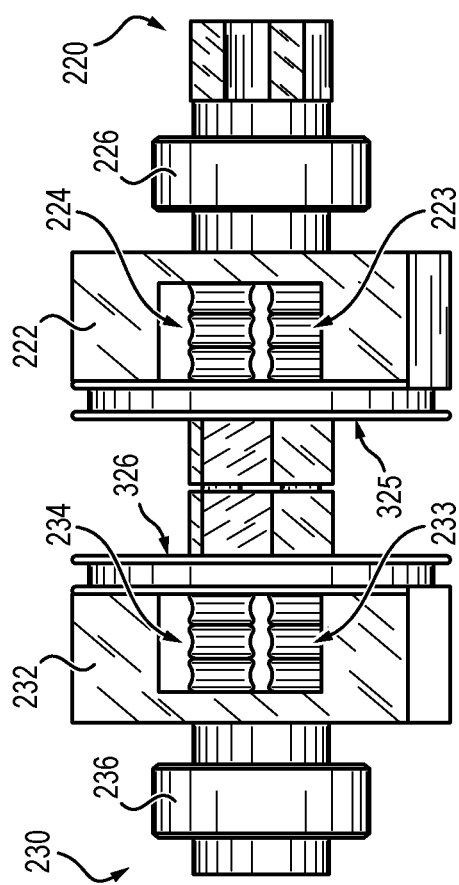
FIG. 13 shows a complete view of a hinge shaft corresponding to the first hinge axis on the base.
Figure 11:
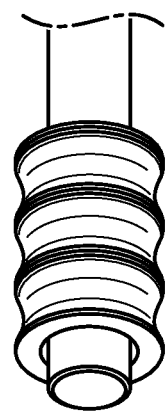
FIG. 11 shows a partial detail view of this assembly and illustrates more precisely a half-shaft equipped with diabolos serving as guides for the cables.
Figure 12:
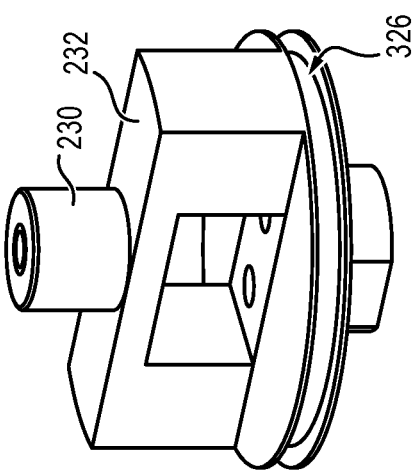
FIG. 12 shows a view of a cage supporting the aforementioned diabolos and a drive pulley.
Figure 14:
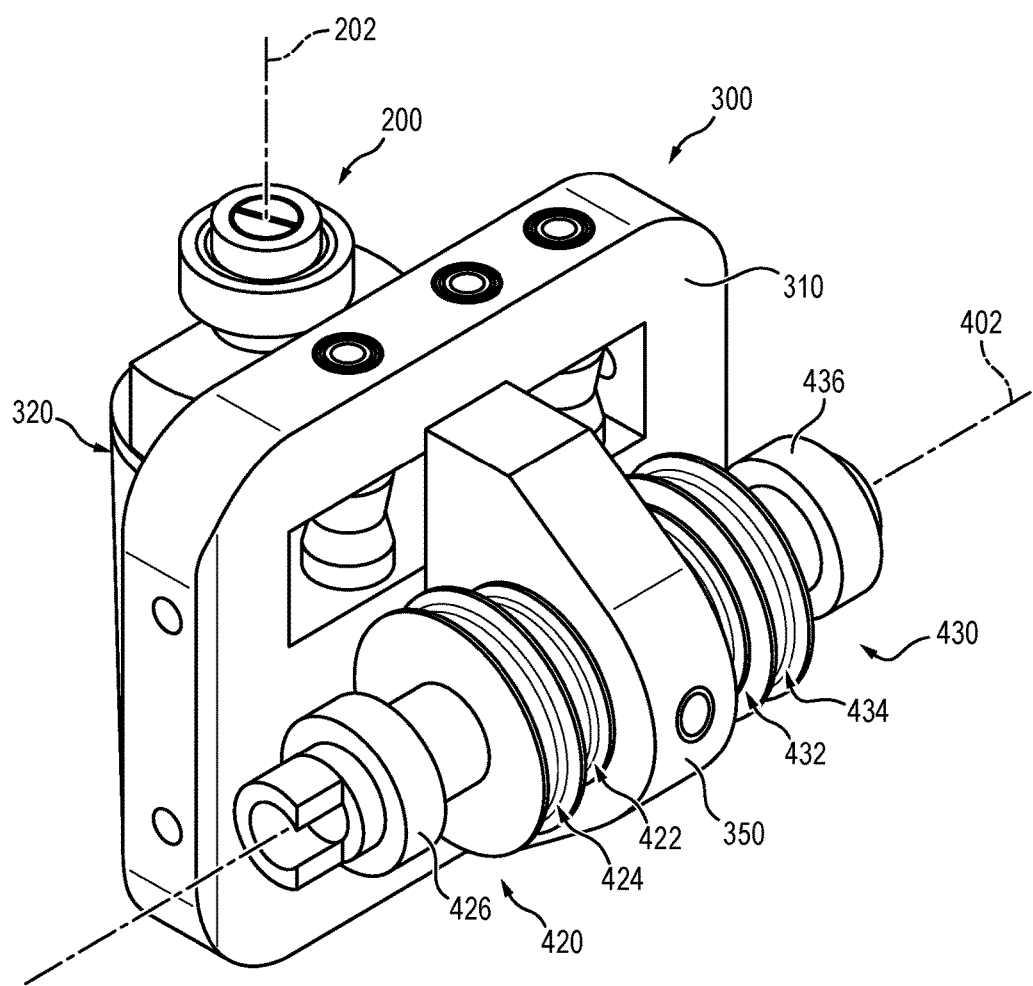
FIG. 14 shows a second partial perspective view, at an observation angle opposite to FIG. 10, of the hinge assembly of the first phalange on the base, around two mutually non-parallel axes, corresponding to abduction-adduction and flexure-extension axes.

According to the embodiment shown in FIGS. 10, 11, and 13, each half-pin 220, 230 guides three cables 122, 132, 142 and 124, 134, 144. Consequently, each series of parts 223, 224 and 233, 234 shaped like a diabolo comprises 3 parts in the shape of a diabolo stacked axially in z.

A set of 6 diabolos is therefore provided on the axis 202 of the abduction-adduction movement, positioned on the upper portion of the axis to guide the cables 122, 132 and 142 as illustrated in FIG. 16*bis* and a set of 6 diabolos on the lower portion of the axis to guide the cables 124, 134 and 144 as illustrated in FIG. 16*ter*.

Each pair of two adjoining diabolos belonging to the two series of parts 223, 224 and 233, 234 located in a common cage 222, 232 thus define respective passages intended to receive the cables 122, 132, 142 and 124, 134, 144. Each cable is thus guided between two rotating diabolos.

These passages, crossing along a respective central axis perpendicular to the median plane of the frame 310, have a symmetry plane which passes through the axis 202 regardless of the relative position of the intermediate assembly 300 with respect to the base 100, by relative rotation around the axis 202.

Each diabolo is capable of rotation around its axis, on a central hinge rod connected to the cage 222 or 232, to limit friction between the cables 122, 132, 142 and 124, 134, 144 and the diabolos.

A person skilled in the art will understand that the displacement in rotation of the actuator 110 in one direction applies a tension force to the adduction cable 112 and, by acting on the pulley 325 and/or the small bridge 320 leads to a displacement of the finger in the adduction direction (see FIG. 16*bis*). Conversely, the displacement in rotation of the actuator 110 in the opposite direction applies a tension force to the abduction cable 114 and, by acting on the pulley 326 and/or the small bridge 320, leads to a displacement of the finger in the abduction direction (see FIG. 16*ter*).

In addition, the frame 310 carries 2 series of 3 diabolo-shaped parts located respectively on either side of the small bridge 320 and intended to guide the cables 122, 124; 132, 134 and 142, 144 toward the downstream hinges. These diabolos are designated 311, 312, 313 in FIG. 16*bis* and 314, 315, 316 in FIG. 16*ter*.

As can be seen in FIGS. 16*bis* and 16*ter*, the cables 112 and 114 can also be guided by the respective diabolos 180, 190 between their exit from the door defined by the two guide needles 151*bis*, 152*bis* and their entry onto the receiving pulleys 325, 326.

After their passage through the abduction-adduction hinge 200, each of the 6 cables 122, 124; 132, 134 and 142, 144 is thus guided by a diabolo 311, 312, 313 and 314, 315, 316 toward the axis of the first flexure-extension movement 400. Among these cables 122, 124; 132, 134 and 142, 144, 2 cables 122, 124 are guided respectively toward the flexure and extension receiving pulleys 525, 526, integral with the axis of the first flexure-extension movement 400.

Moreover, the frame 310 carries on its second face a small bridge 350 in the shape of a dihedron, the median plane whereof extends at rest in a xz-plane and which supports in rotation two coaxial flexure-extension half-shafts or pins 420, 430 in y centered on the axis 402. The pins 420, 430 are hinged to the adjoining end of the phalange 500 by any appropriate means.

The two half-shafts or pins 420, 430 are located respectively on either side of the small bridge 350. One of the pins 420 carries two pulleys 422, 424 on which the cables 142 and 134 are respectively wound by making one turn around these pulleys. The other half pin 430 carries two pulleys 432, 434 on which the cables 144 and 132 are respectively wound by making one turn around these pulleys. The pulleys 422, 424 and 432, 434 are free in rotation with respect to the small bridge 350 around the axis 402.

The dead turn of the cables carried out around the guide pulleys 422, 424 and 432, 434, free in rotation around their axes, makes it possible to prevent the cables 132, 134 and 142, 144 from leaving the pulleys due to the hinge configuration of the flexure-extension movement of the phalanges.

The ends of the pins 420 and 430 carry means 426, 436, such as ball bearings, forming bearings for guiding in rotation the adjoining end, for example in the shape of a clevis 520 of the first phalange 500.

Figure 15:
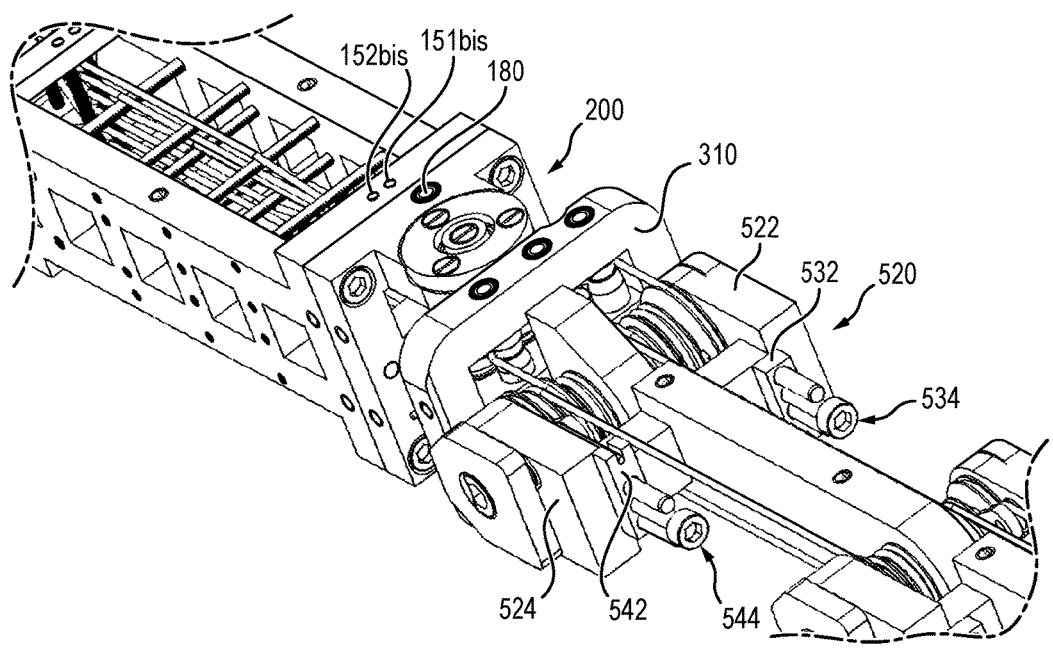
FIG. 15 shows a perspective view of the complete hinge assembly of the first phalange on the base around two non-parallel axes.

Moreover, the second end of the cables 122, 124 is attached to this end of the first phalange 500, on sides opposite to the axis 402, as can be seen in FIG. 15.

More precisely, preferably both branches 522, 524 of the clevis 520 carries pulleys 525, 526 centered on the axis 402, guiding the second respective end of the cables 122, 124.

The pulleys 525, 526 must be connected in rotation with the clevis 520 if the ends of the cables 122, 124 are attached to these pulleys.

The pulleys 525 and 526 can be free in rotation with respect to the clevis 520, around the axis 402, if the ends of the cables 122, 124 are attached, not to the aforementioned pulleys, but to the clevis 520.

At this level of preference the end of the first phalange 500 adjoining the hinge 400 also has means 530, 540 for adjusting the tension of cables 122 and 124. These adjustment means 530, 540 can be subject to many embodiments.

According to the particular embodiment shown in the appended figures, these adjustment means 530, 540 each comprise a fork 532, 542 which receives the end of a cable 122 and 124, for example such an end equipped with a stop knot, and the distance from the axis 402 whereof can be adjusted by a screw 534, 544.

Figure 17:
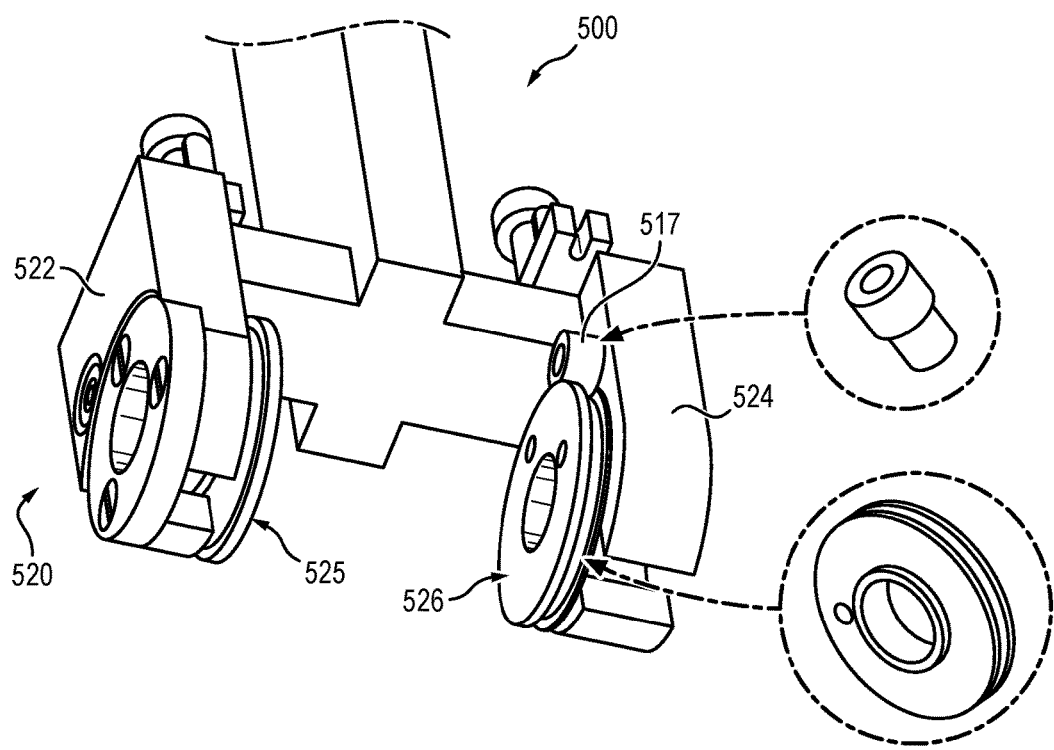
FIG. 17 shows a partial perspective view of a hinge between two phalanges, and illustrates in particular receiver pulleys involved in driving and cable tension control devices.
Figure 18:
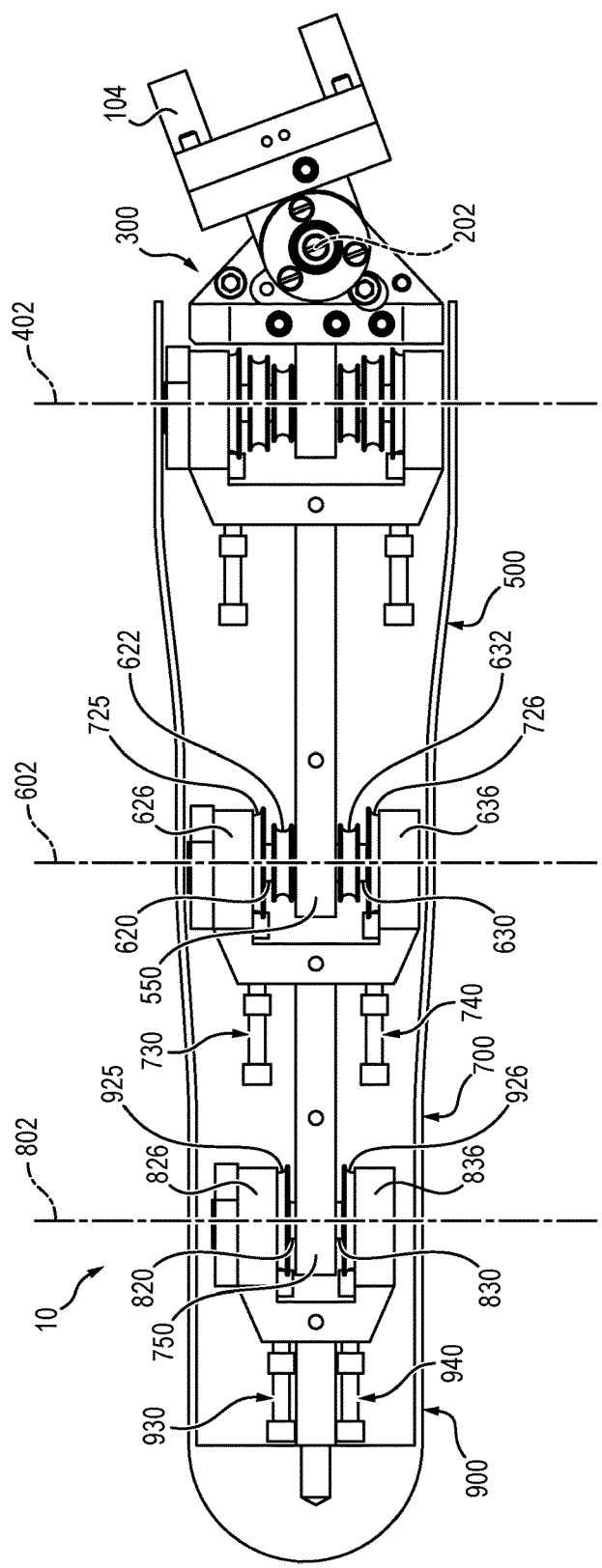
FIG. 18 shows a top view of a complete finger comprising three phalanges.

As can be seen in FIG. 17, cylindrical pins 517 preferably allow guiding of the cables 122 and 124 leaving the receiving pulleys 525, 526 toward the fine tension adjustment means 530, 540 of the cable 122, 124.

A person skilled in the art will understand that the displacement in rotation of the actuator 120 in one direction applies a tension force on the flexure cable 122 and by acting on the end of the phalange 500 leads to a displacement of the finger in the flexure direction. Conversely, the displacement in rotation of the actuator 120 in the opposite direction applies a tension force on the extension cable 124 and by acting on the end of the phalange 500 leads to a displacement of the finger in the extension direction.

Finally, 4 cables 132, 142 and 134, 144 leave the second hinge, via 4 dedicated pulleys 422, 424, 432 and 434, so as to be routed respectively toward the flexure-extension movements of the intermediate phalange 700 and flexure-extension movements of the distal phalange 900. To avoid having these 4 cables 132, 142 and 134, 144 leave the pulleys due to the hinge configuration of the flexure-extension movement of the proximal phalange 500, a dead turn on these guide pulleys 422, 424, 432 and 434, free in rotation on the movement axis, is carried out.

The hinges 600 and 800 are preferably similar to the aforementioned hinge 400.

Thus the second end or distal end of each phalange 500 and 700 carries a small bridge 550, 750 in the shape of a dihedral the median plane whereof extends in a xz-plane and which supports in rotation two respective coaxial flexure-extension half-shafts or pins 620, 630 and 820, 830 in y centered on the axes 602 and 802. The pins 620, 630 and 820, 830 are hinged to the adjoining end of the following phalange 700, 900 by any appropriate means.

The two half-shafts or pins 620, 630 are located respectively on either side of the small bridge 550. Each pin 620, 630 carries a pulley 622, 632 on which the cables 142 and 144 are respectively wound by making one turn around these pulleys. The pulleys 622, 632 are free in rotation with respect to the small bridge 550 around the axis 602.

The ends of the pins 620 and 630 carry means 626, 636, such as ball bearings, forming bearings for guiding in rotation the adjoining end, for example in the shape of a clevis 720 of the second phalange 700.

Moreover, the second end of the cables 132, 134 is attached to this end of the second phalange 700, on opposite sides of the axis 602.

More precisely, preferably the two branches 722, 724 of the clevis 720 carries pulleys 725, 726 centered on the axis 602, guiding the respective second end of the cables 132, 134.

At this level of preference, the end of the second phalange 700 adjoining the hinge 600 also has means 730, 740 for adjusting the tension of the cables 132 and 134, similar to the aforementioned means 530, 540.

A person skilled in the art will understand that the displacement in rotation of the actuator 130 in one direction applies a tension force on the flexure cable 132 and, by acting on the end of the phalange 700 leads to a displacement of this phalange of the finger in the flexure direction. Conversely, the displacement in rotation of the actuator 130 in the opposite direction applies a tension force on the extension cable 134 and, by acting on the end of the 700 leads to a displacement of the finger in the extension direction.

Similarly, the two half-shafts or pins 820, 830 are located on either side of the small bridge 750.

The ends of the pins 820 and 830 carry means 826, 836, such as ball bearing, forming bearings for guiding in rotation the adjoining end, for example in the shape of a clevis 920 of the third phalange 900.

Moreover, the second end of the cables 142, 144 is attached to this end of the third phalange 900, on opposite sides of the axis 802.

More precisely, preferably the two branches 922, 924 of the clevis 920 carries pulleys 925, 926 centered on the axis 802, guiding the respective second end of the cables 142, 144.

At this level of preference, the end of the third phalange 900 adjoining the hinge 800 also has means 930, 940 for adjusting the tension of the cables 142 and 144, similar to the aforementioned means 530, 540.

A person skilled in the art will understand that the displacement in rotation of the actuator 140 in one direction applies a tension force on the flexure cable 142 and, by acting on the end of the phalange 900, leads to a displacement of this phalange of the finger in the flexure direction. Conversely, the displacement in rotation of the actuator 140 in the reverse direction applies a tension force on the extension cable 144 and, by acting on the end of the phalange 900, leads to a displacement of the finger in the extension direction.

According to the invention, the transmission of the movement between each actuator 110, 120, 130 and 140 and the respective hinge 200, 400, 600 and 800 is accomplished by cables 112, 114; 122, 124; 132, 134 and 142, 144. More precisely, two transmission cables are provided for each hinge 200, 400, 600 and 800. Each cable 112, 114; 122, 124; 132, 134 and 142, 144 is attached, on the one hand at a drive pulley 113, 115; 123, 125; 133, 135 and 143, 145 on the actuator side and on the other hand, at a receiving pulley 325, 326, 525, 526, 725, 726, 925, 926 on the hinge side.

As was previously described, the 3 phalanges of a finger conforming to the invention are made according to the same principle. This offers in particular the following advantages:
the possibility of modulating the length of each phalange according to the application,
the possibility of attaching a cowling,
the possibility of routing the instrumentation signals,
the possibility of integrating instrumentation for measuring position and force.

The finger previously described comprises a passage of cables over guide pulleys at the hinges 400, 600 and 800. The result at this level is variations of length of the cables induced by the displacement in articulation of the phalanges placed downstream. However, the coupling relations can be calculated numerically based on the diameters of the pulleys and the induced variations of length of the cables can be corrected thanks to this mechanical coupling relation between the hinges of a finger and the corresponding gear motors, the coupling relation being of the type:

$$Q = A \cdot Q^* \text{ wherein}$$

$Q=[q1, q2, q3, q4]$ and represents the movements of the hinges of a finger, A represents the coupling matrix of the finger and
$Q^*=[q1, q2, q3, q4]$ and represents the movements of the corresponding gear motors.

Thus all the hinges can be controlled individually by taking into account the coupling relations in the position control of the finger.

Modularity in the design of the finger proposed according to the invention allows an assembly of several fingers 10 to construct a robotic hand with several fingers, even an anthropomorphic hand in terms of kinematics and dimensions.

The combination of several fingers 10 can be created by placing two fingers 10 facing one another having their abduction-adduction axes 202 coaxial or parallel, to accomplish for example a gripper with two facing fingers.

Figure 19:
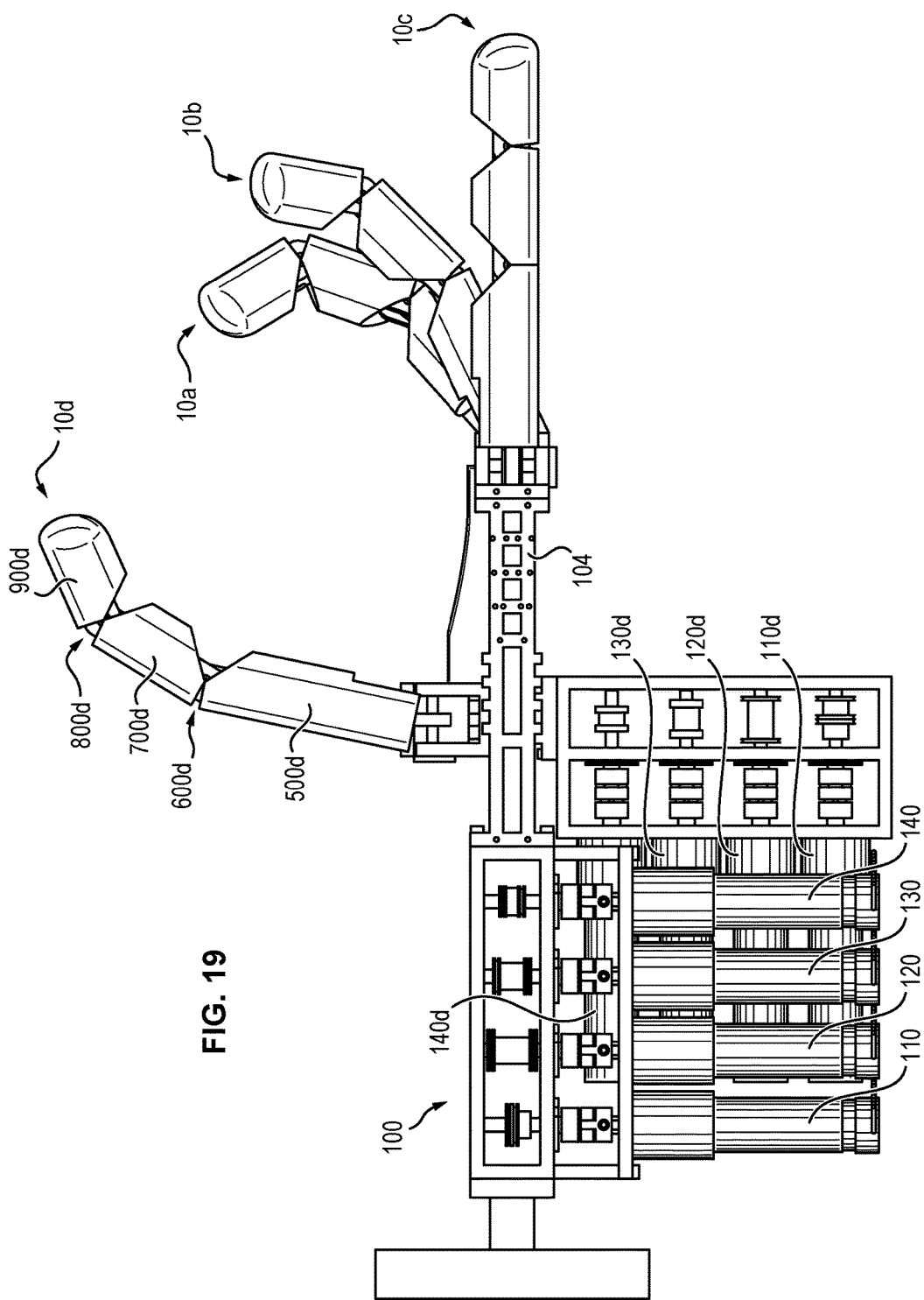
FIG. 19 shows a lateral view in a sagittal plane of a hand with several fingers conforming to the invention.
Figure 20:
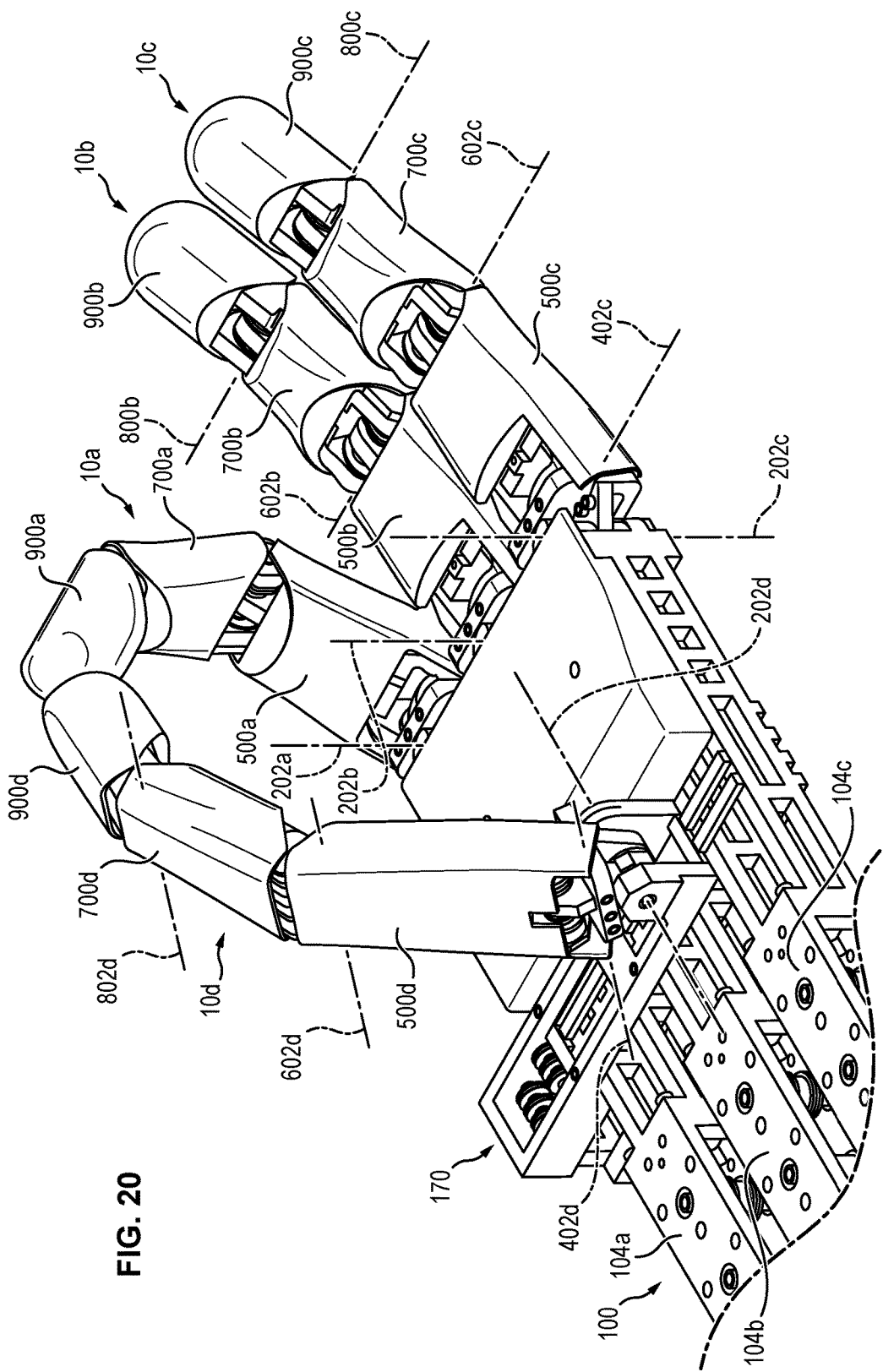
FIG. 20 illustrates in perspective an embodiment of a hand with 4 fingers conforming to the invention, with the possibility of grasping.

As illustrated in FIGS. 19 and 20 one can however assemble on a common base 100 forming a palm several fingers 10 having their first flexure-extension axes 402 coaxial, and facing a finger 10 forming a thumb, so as to propose a device making it possible to have the behavior of a natural hand, even an anthropomorphic hand.

Illustrated in FIGS. 19 and 20 is a hand comprising three fingers 10a, 10b and 10c having their first flexure-extension axes 402a, 402b and 402c coaxial and a thumb 10d the abduction-adduction axis whereof 202d extends in x, or perpendicularly to the plane containing the abduction-adduction axes 202a, 202b and 202c of the aforementioned fingers, while its flexure-extension axes 402d, 602d and 802d extend in y. The fingers 10a, 10b and 10c and the thumb 10d illustrated in FIGS. 19 and 20 bear numerical references identical to those used previously, to which subscripts a, b, c, and d are appended.

According to the embodiment illustrated in FIG. 19, the actuators 110d, 120d, 130d and 140d have their axes oriented in x. The associated cables extend in z up to the peak of the base, at which said cables are deviated 90° by appropriate return pulleys 170 in the direction of the hinge 200d of the thumb 10d.

The hand thus obtained allows all the handling that an anthropomorphic hand allows, for example grasping with the palm in all diameters, grasping with the tips of the fingers.

Within the scope of the invention, "complete actuation" is considered to mean a movement of each hinge, finely controlled in position and in force and independent of the other hinges of the same finger.

Of course the present invention is not limited to the embodiments described earlier, but extends to all variants conforming to its spirit.

The invention claimed is:

1. A device forming a robotic finger including a base forming a palm, at least one phalange hinged to the base around two hinges, a first hinge, rotatably mounted along an axis, the first hinge having an input and an output, and a second hinge, the two hinges being independent not parallel with one another, at least two actuators, first and second cables forming linking means connecting respectively the two actuators to driving elements of said two hinges, the first cables, connected to the first hinge, and the second cables, connected to the second hinge, each of said first and second cables having a diameter and a length, each of said first and second cables having ends, and guide means, comprising a first guide stage, the first guide stage comprising an input and an output, adapted for guiding the second cables connected to the second hinge in order to control the second hinge located after the first hinge on the base, in a common plane passing through the axis of this first hinge, characterized in that the guide means are formed from cylindrical needles extending along axes parallel to the first hinge axis, carried by the base, that the device comprises at least two needles at the output of the first guide stage the separation whereof corresponds to the diameter of the first and second cables and an operational clearance for ensuring free translation of the first and second cables, the two needles being positioned symmetrically on either side of a plane of symmetry passing through the first hinge axis and guiding the first and second cables at the input of the first hinge, and that the device further comprises a frame which carries two series of rotating parts, symmetric with respect to the axis of the first hinge and intended to guide the second cables coming from the first guide stage formed by said needles, toward the second hinges.

2. The device according to claim 1, characterized in that the first hinge axis on the base constitutes an abduction-adduction axis, while the second hinge axis constitutes a flexure-extension axis.

3. The device according to claim 1, characterized in that it comprises a second guide stage of guide means placed between the first guide stage and the first hinge and the function whereof is to guide and stage the first and second cables at the input of the first hinge so as to avoid any contact between the first and second cables.

4. The device according to claim 1, characterized in that the driving elements are receiving drive pulleys and the ends of the first and second cables opposite to the actuators are engaged in the receiving drive pulleys associated respectively with the two hinges.

5. The device according to claim 1, characterized in that the second cables connected to the second hinge are guided respectively between the two series of rotating parts.

6. The device according to claim 1, characterized in that the second hinge comprises two half-shafts or pins each of which carries two pulleys free in rotation on which the second cables are respectively wound by making one turn around these pulleys.

7. The device according to claim 1, characterized in that it comprises means for adjusting the tension of the first and second cables.

8. The device according to claim 7, characterized in that the adjustment means each comprise a reception means for one of the ends of each of said first and second cables and means for adjusting the position of this reception means with respect to its support.

9. The device according to claim 1, characterized in that it comprises several phalanges hinged to one another two by two around a single-axis hinge associated with a respective actuator.

10. The device according to claim 1, characterized in that the transmission of movement between each hinge and the associated actuator is ensured the first and second cables, which make it possible to ensure respectively a flexure or abduction movement and an extension or adduction movement.

11. The device according to claim 1, characterized in that it comprises a means for measuring force at the tip of the finger.

12. The device according to claim 1, characterized in that it comprises several fingers forming a robotic gripper or hand with several fingers, an anthropomorphic hand in terms of kinematics and dimensions.

13. The device according to claim 1, characterized in that it comprises memory means for storing in memory the coupling relations of the hinges inducing a variation in length in the first and second cables during activation and for consequently correcting the control of the actuators so as to neutralize the variations of cable length induced.

* * * * *